US009712597B2

(12) United States Patent
Chen et al.

(10) Patent No.: US 9,712,597 B2
(45) Date of Patent: Jul. 18, 2017

(54) MEDIA DATA PROCESSING METHOD AND NON-TRANSITORY COMPUTER READABLE STORAGE MEDIUM THEREOF

(71) Applicant: HTC Corporation, Taoyuan (TW)

(72) Inventors: Chien-Wen Chen, Taoyuan (TW);
Pai-Chang Yeh, Taoyuan (TW);
Mao-Chiang Tsai, Taoyuan (TW);
Jui-Pang Wang, Taoyuan (TW);
Chun-Tang Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/589,966

(22) Filed: Jan. 5, 2015

(65) Prior Publication Data

US 2015/0200999 A1    Jul. 16, 2015

Related U.S. Application Data

(60) Provisional application No. 61/923,786, filed on Jan. 6, 2014.

(51) Int. Cl.
| | |
|---|---|
| *G11B 27/00* | (2006.01) |
| *H04L 29/08* | (2006.01) |
| *G06Q 10/10* | (2012.01) |
| *G11B 27/026* | (2006.01) |
| *G11B 27/034* | (2006.01) |
| *H04L 29/06* | (2006.01) |

(52) U.S. Cl.
CPC ........... *H04L 67/06* (2013.01); *G06Q 10/101* (2013.01); *G11B 27/026* (2013.01); *G11B 27/034* (2013.01); *H04L 67/42* (2013.01)

(58) Field of Classification Search
CPC ............................... G11B 27/34; H04L 64/06
USPC .............................. 386/278; 725/61; 715/723
See application file for complete search history.

(56) References Cited

U.S. PATENT DOCUMENTS

| 9,143,542 B1* | 9/2015 | Tseytlin ................. H04L 65/403 |
| 2012/0311448 A1 | 12/2012 | Achour et al. |
| 2013/0283319 A1 | 10/2013 | Marshall et al. |
| 2014/0289818 A1* | 9/2014 | Yahata .................. H04N 21/854 |
| | | 726/4 |
| 2015/0182861 A1* | 7/2015 | Winter ............... G06Q 30/0261 |
| | | 705/14.14 |

OTHER PUBLICATIONS

Corresponding European Search Report that these art references were cited on Jun. 2, 2015.
First Communication of the Corresponding European Application issued on Jun. 16, 2015.

* cited by examiner

*Primary Examiner* — Thai Tran
*Assistant Examiner* — Mishawn Hunter
(74) *Attorney, Agent, or Firm* — CKC & Partners Co., Ltd.

(57) ABSTRACT

A media data processing method is provided herein. The media data processing method is adapted for a portable mobile device. The media data processing method includes: selecting at least one first media file in a first client; uploading the at least one first media file to a server; mixing and editing the at least one first media file and at least one second media file in the server to generate a video.

17 Claims, 10 Drawing Sheets

MEDIA DATA PROCESSING METHOD AND NON-TRANSITORY COMPUTER READABLE STORAGE MEDIUM THEREOF

CROSS-REFERENCE TO RELATED APPLICATION

This application claims the priority benefit of U.S. Provisional Application Ser. No. 61/923,786, filed Jan. 6, 2014, the full disclosures of which are incorporated herein by reference.

BACKGROUND

Field of Disclosure

The disclosure relates to a media data processing method, and more particularly, to a media data processing method for sharing media files by several clients.

Description of Related Art

Recently, with the advance of social networking websites (e.g., Facebook, Twitter, Instagram, etc.) and smart mobile phone, it has become more and more popular to share the taken photos or films to friends immediately. Moreover, it is also popular to edit several taken photos into a video and present it to friends in a form of a story.

However, in conventional approaches, user only can edit its own photos and fails to edit the photos with other materials together, such that variety of content of the video is limited. Moreover, the user only can view the video created by other users without anticipation, such that enjoyment for editing the video is limited, too.

SUMMARY

In order to solve aforesaid problems, the disclosure provides a media data processing method which allows different clients to select and edit media data.

One aspect of the disclosure is to provide a media data processing method. The media data processing method is adapted for a portable mobile device. The media data processing method includes: selecting at least one first media file by a first client; uploading the at least one first media file to a server; mixing and editing the at least one first media file and at least one second media file in the server to generate a video.

According to an embodiment of the disclosure, the media data processing method further includes a step of returning the video to the first client by the server.

According to an embodiment of the disclosure, the media data processing method further includes a step of posting a linked address corresponding to the video on at least one social networking website of a user of the first client by the server.

According to an embodiment of the disclosure, the step of mixing and editing the at least one first media file and the at least one second media file in the server to generate the video includes steps of: inviting a second client to upload the at least one second media file to the server by the first client; and, mixing and editing the at least one first media file and the at least one second media file to generate the video.

According to an embodiment of the disclosure, the step of mixing and editing the at least one first media file and the at least one second media file to generate the video includes steps of: selecting a plurality of third media files among the at least one first media file and the at least one second media file by the first client or the second client; selecting a theme among a plurality of build-in themes and a music among a plurality of build-in music by the first client or the second client; and, mixing and editing the third media files according to the selected theme and music to generate the video.

According to an embodiment of the disclosure, the step of inviting the second client to upload the at least one second media file to the server by the first client includes steps of: sending a mix-and-edit invitation notification to the second client from the first client according to a user name or an e-mail address of the second client; selecting the at least one second media file by the second client on condition that the second client accepts the mix-and-edit invitation notification; and, uploading the at least one second media file to the server.

According to an embodiment of the disclosure, the step of mixing and editing the at least one first media file and the at least one second media file in the server to generate the video includes steps of: searching for the at least one second media file uploaded by at least one third client in the server; selecting a plurality of third media files among the at least one first media file and the at least one second media file by the first client; and, mixing and editing the third media files to generate the video.

According to an embodiment of the disclosure, the step of mixing and editing the at least one first media file and the at least one second media file in the server to generate the video includes steps of: selecting a theme among a plurality of build-in themes and a music among a plurality of build-in music; and, mixing and editing the at least one first media file and the at least one second media file according to the selected theme and music to generate the video.

According to an embodiment of the disclosure, the step of selecting the at least one first media file by the first client includes a step of selecting the at least one first media file from an album corresponding to the first client. The album includes a plurality of stored media files. Each of the stored media file includes a number of comments. The number of comments corresponding to the first media file is greater than a threshold number.

According to an embodiment of the disclosure, the step of selecting the at least one first media file by the first client includes a step of selecting the at least one first media file from an album corresponding to the first client. The album includes a plurality of stored media files. Each of the stored media file includes a time of shooting. A period between the time of shooting corresponding to the first media file and a time of selecting the first media file is within a threshold period.

Another aspect of the disclosure is to provide a media data processing method. The media data processing method is adapted for a portable mobile device. The media data processing method includes: selecting at least one first media file by a first client; uploading the at least one first media file to a server by the first client; selecting at least one second media file by a second client; uploading the at least one second media file to the server by the second client; mixing and editing the at least one first media file and the at least one second media file by the first client or the second client to generate a video in the server.

According to an embodiment of the disclosure, the media data processing method further includes a step of returning the video to the first client or the second client by the server.

According to an embodiment of the disclosure, the step of selecting the at least one second media file by the second client include steps of: sending a mix-and-edit invitation notification to the second client by the first client; and, selecting the at least one second media file by the second client on condition that the second client accepts the mix-and-edit invitation notification.

According to an embodiment of the disclosure, the step of mixing and editing the at least one first media file and the at least one second media file by the first client or the second client to generate the video in the server include steps of: selecting at least one third media file among the at least one first media file and the at least one second media file by the first client or the second client; and, mixing and editing the at least one third media file according to a theme of a plurality of build-in themes and a music of a plurality of build-in music by the server.

Another aspect of the disclosure is to provide a non-transitory computer-readable recording medium storing a computer program performing a media data processing method. The media data processing method includes: selecting at least one first media file by a first client; uploading the at least one first media file to a server, mixing and editing the at least one first media file and at least one second media file in the server to generate a video.

According to an embodiment of the disclosure, the media data processing method further includes a step of returning the video to the first client by the server and/or posting a linked address corresponding to the video on at least one social networking website of a user of the first client by the server.

According to an embodiment of the disclosure, the step of mixing and editing the at least one first media file and the at least one second media file in the server to generate the video includes steps of: inviting a second client to upload the at least one second media file to the server by the first client; and, mixing and editing the at least one first media file and the at least one second media file to generate the video.

According to an embodiment of the disclosure, the step of mixing and editing the at least one first media file and the at least one second media file to generate the video includes steps of: selecting a plurality of third media files among the at least one first media file and the at least one second media file by the first client or the second client; selecting a theme among a plurality of build-in themes and a music among a plurality of build-in music by the first client or the second client; and, mixing and editing the third media files according to the selected theme and music to generate the video.

According to an embodiment of the disclosure, the step of inviting the second client to upload the at least one second media file to the server by the first client includes steps of: sending a mix-and-edit invitation notification to the second client from the first client according to a user name or an e-mail address of the second client; selecting the at least one second media file by the second client on condition that the second client accepts the mix-and-edit invitation notification; and, uploading the at least one second media file to the server.

According to an embodiment of the disclosure, the step of mixing and editing the at least one first media file and the at least one second media file in the server to generate the video include steps of: searching for the at least one second media file uploaded by at least one third client in the server, selecting a plurality of third media files among the at least one first media file and the at least one second media file by the first client; and, mixing and editing the third media files to generate the video.

According to aforesaid embodiments, the user may not only mix and edit media file of his own but also mix and edit together with media file uploaded by other clients, such that the contents of mixed video can include a large diversity and variability.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
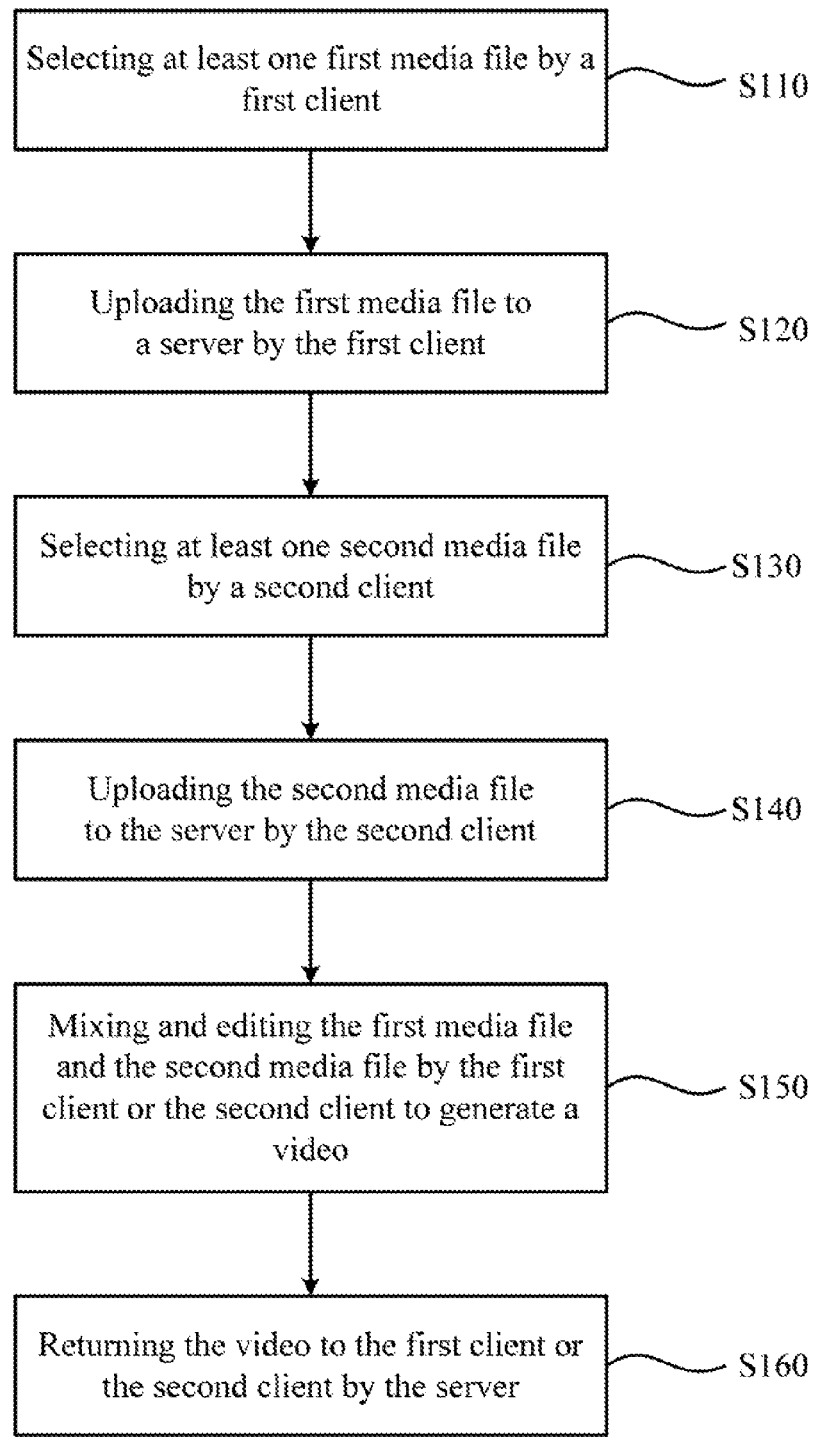
FIG. 1 illustrates a flow chart of a media data processing method according to one embodiment of the disclosure.

Reference will now be made in detail to embodiments of the disclosure, examples of which are illustrated in the accompanying drawings. However, the embodiments do not intend to limit the scope covered by the present disclosure, and the descriptions regarding structures and operation do not limit their operation sequence. Any devices or structures formed by elements re-combinations and having equivalent effects are all within the scope covered by the present disclosure. Wherever possible, the same reference numbers are used in the drawings and the description to refer to the same or like parts.

It will be understood that, although the terms "first," "second," etc., may be used herein to describe various elements, these elements should not be limited by these terms. These terms are used to distinguish one element from another, and do not intend to point out a specific order or sequence. For example, a first element could be termed a second element, and, similarly, a second element could be termed a first element, without departing from the scope of the embodiments.

Reference is made to FIG. 1. FIG. 1 illustrates a flow chart of a media data processing method 100 according to one embodiment of the disclosure. The media data processing method 100 is adapted for a portable mobile device, such as a smart phone, a tablet PC, etc. Specifically, the media data processing method 100 is configured to mix and edit media files (e.g., photos or films), a specific theme and music selected by user, so as to generate a short-period (e.g., 30 seconds) video. The video is generated in a form of slide show video.

In one embodiment, the media data processing method 100 of the disclosure can be implemented by the portable device and installed programs thereof. For example, the user can install a specific digital album, an image-editing program, a social networking program, etc. in the portable mobile device, and perform operations of selecting photos/films, uploading, edition, and setting parameters, arrangement, and generation of the video by operating user interfaces provided by the installed programs on the portable mobile device.

AS shown in FIG. 1, first, in operation S110, at least one first media file is selected by a first client. The first client can be a first portable mobile device (e.g., a smart phone or a tablet PC) operated by a user (e.g., a first user). Specifically, the first user can select at least one first media file (e.g., a photo or a film) among an album program installed in the first portable mobile device as partial of content of a desired mix-and-edited video.

Next, in operation S120, the at least one first media file is uploaded to a server by the first client. Specifically, the first portable mobile device has wireless Internet access function, such as 3G and 4G mobile communication, WIFI, etc. The first user can upload the first media files to the server by connecting the first portable mobile device to the server while selecting the first media files.

In operation S130, at least one second media file is selected by a second client. Similarly, the second client can be a second portable mobile device (e.g., a smart phone or a tablet PC) operated by another user (e.g., a second user). The second user also can select at least one second media file among an album program installed in the second portable mobile device as partial of content of a desired mix-and-edited video. Next, in operation S140, the at least one second media file is uploaded to the server by the second client. Similarly, the second portable mobile device also has wireless Internet access function. The second user can upload the second media files to the server by connecting the second portable mobile device to the server while selecting the second media files.

It is noted that in the present embodiment, in order to describe the embodiment conveniently, the number of the clients is two, but the disclosure is not limited in this regard. In other words, the number of the clients can be greater than two in the media data processing method 100. Accordingly, several users can upload photos/films together by the media data processing method 100 of the present embodiment.

Next, in operation S150, the at least one first media file and the at least one second media file are mixed and edited by the first client or the second client, so as to generate a video in the server. Specifically, in the media data processing method 100, each of clients (e.g., the first and second client) can upload the selected media file to the same server by a specific application program (e.g., Zoe application program of HTC). In other words, the server provides a common cloud storage medium for storing the media file uploaded by each user by the application program.

After uploading the first media files to the server, the first user can browse the media files stored in the server on a user interface provided by the application program (e.g., Zoe). In other words, the first user not only can see the uploaded first media by itself, but also see the media files uploaded by other clients (e.g., the second media files uploaded by the second user). Similarly, in the present embodiment, the second user also can see the first media files and the second media files on a user interface. Therefore, the first user and the second user both can mix and edit the media files stored in the server (e.g., the first media files and the second media files) to generate the video.

Further, user of each of the clients can further select partial of the media files stored in the server for performing operation of mix and edition. For example, for the first client, the first user can further select media files (e.g., the third media files) among the first media files and the second media files for performing operation of mix and edition, and not limited in mixing and editing all the first media files uploaded by itself. Therefore, the user can selectively adjust desired content of the video.

In one embodiment, the video is generated by serially broadcasting several photos from the first media files or the second media files in a form of slide show video. The broadcasting way can be broadcasting the photos one after another according to a random sequence, a sequence of time of shooting of the photos, or a sequence decided by the user; or broadcasting the photos and films (from the first media file or the second media file) in cross, in other words, adding the film selected by the user into an interval between periods of broadcasting the photos.

Moreover, in one embodiment, the specific application program (e.g., Zoe) can further provide several build-in parameters (e.g., theme and music) for the user to select. The user can adjust style of the video by setting the parameters (e.g., selecting theme and music). Then, the server performs operation of mix and edition on the media files (e.g., the third media files) according to the setting parameters (e.g., the selected theme and music), so as to generate a personal video for the user.

Next, in operation S160, the video is returned to the first client or the second client by the server. Specifically, if the selected theme, music, and the media files are mixed and edited by the first client, then the server returns the video to the first client for the user of the first client to view after the server generates the video. In the same way, if it is the second client to perform operation of mix and edition, then the server returns the video to the second client for the user of the second client to view.

In one embodiment, in operation of mix and editing the media files, user of each of the clients can post the video on personal social networking websites (e.g., Facebook, Twitter, Instagram, etc.). Therefore, in addition to return the video to the client, the server can further generate a linked address corresponding to the video and post the liked address on the social networking websites selected by the client after the server generates the video. Accordingly, the user not only can view the edited video on the user interface of the client, but also can view the edited video on the social networking websites. Moreover, the edited video can be shared to other users on the social networking websites.

By the aforementioned media data processing method 100, two different clients (e.g., the first and second client) can edit the video together. For example, after the user travels with friends, the user may want to invite the friends to create the video corresponding to the travel together when the user arranges the photos of the travel.

Accordingly, in one embodiment, the first client and the second client may be relevant to each other. In the present embodiment, after the first client uploads the media files, user of the first client can invite user of another client (e.g., the second user of the second client) to create the video together. Further, the first user can send a mix-and-edit invitation notification to the second client by the user interface of the first client. On condition that the second user accepts the mix-and-edit invitation notification, the second user can select the second media files in the second client and uploads the second media files to the server. In other words, the invited second user also can select desired media files for performing operation of mix and edition.

In one embodiment, the first user can input a name or an e-mail address of user of the second client (i.e., the second user). Thus, the application program (e.g., Zoe) can send the mix-and-edit invitation notification to the second client according to the name or the e-mail address of the second user.

Specifically, on condition that the second client is invited by the first client to upload the second media files, the first client and the second perform operation of mix and edition in a private mode. In one embodiment, when performing operation of mix and edition in the private mode, the first media files and the second media files in the server are only open to the users of the first client and the second client. In other words, other clients fail to have authority to view the first media files and the second media files in the server. In simple, in the private mode, only the user itself (e.g., the first user) and the invited user (e.g., the second user) can view, select and edit the media files uploaded by each other, and other users (other clients registered in the server) fail to have authority to view, select and edit the media files uploaded by the first and second client.

In another embodiment, the first and second client are irrelevant. In other words, the first user can randomly select the media files uploaded by unknown users in the server for performing operation of mix and edition, in which the media files are allowed to be used in public; or, the first user can randomly select the stored public photos, template photos, public materials and the first media files uploaded by itself for performing operation of mix and edition. The second user can randomly select the stored public photos, template photos, public materials and the second media files uploaded by itself for performing operation of mix and edition, too. In this condition, the first client and the second client perform operation of mix and edition in a public mode. In the public mode, the media files uploaded by any client can be shared to other clients to view, select and edit.

By the aforementioned embodiments, user can perform operation of mix and edition on his own media files and other's media files, such that content of the video becomes more abundant and diversified. Moreover, by performing operation of mix and edition on the media files in the private mode or in the public mode, the user can decide to select the materials and edit the video with strangers or friends, such that enjoyment for editing video is increased and content of the edited video becomes more diversified.

Figure 2A:
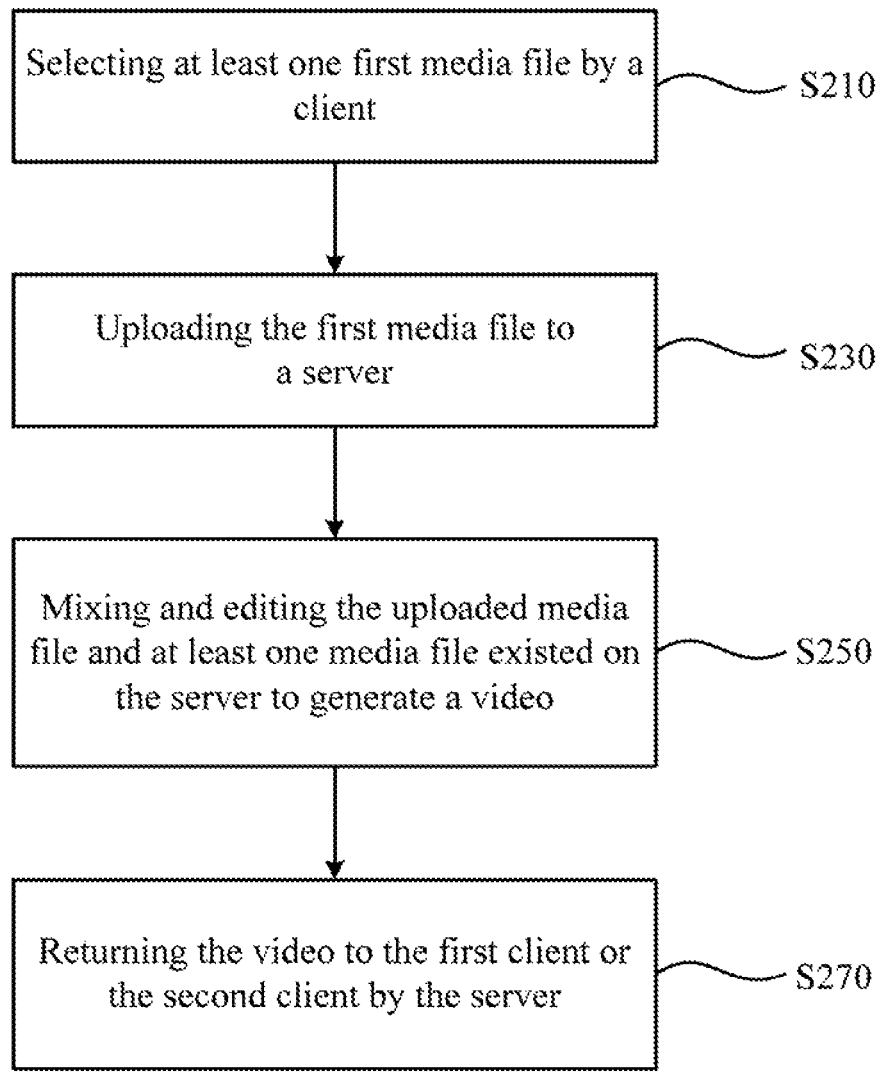
FIG. 2A illustrates a flow chart of a media data processing method according to another embodiment of the disclosure.

Reference is made to FIG. 2A. FIG. 2A illustrates a flow chart of a media data processing method 200 according to another embodiment of the disclosure. Similarly, the media data processing method 200 is adapted for a portable mobile device, such as a smart phone, a tablet PC, etc. Specifically, the media data processing method 200 is configured to mix and edit media files (e.g., photos or films), a specific theme and music selected by users, so as to generate a short-period (e.g., 30 seconds) video. The video is generated in a form of slide show video.

The media data processing method 200 can be implemented as a computer program product (such as a computer program), and stored in a computer-readable recording medium. After loading in the computer-readable recording medium, a computer performs the media data processing method 200. The machine-readable medium can be, but is not limited to, a floppy diskette, an optical disk, a compact disk-read-only memory (CD-ROM), a magneto-optical disk, a read-only memory (ROM), a random access memory (RAM), an erasable programmable read-only memory (EPROM), an electrically erasable programmable read-only memory (EEPROM), a magnetic or optical card, a flash memory, a network accessible library or another type of media/machine-readable medium suitable for storing electronic instructions.

As shown in FIG. 2A, first, in operation S210, at least one media file is selected by a client. The client can be a portable mobile device (e.g., a smart phone or a tablet PC) operated by a user. Specifically, the user can select at least one media file (e.g., a photo or a film) among an album program installed in the first portable mobile device as partial of content of a desired mix-and-edited video.

Figure 3B:
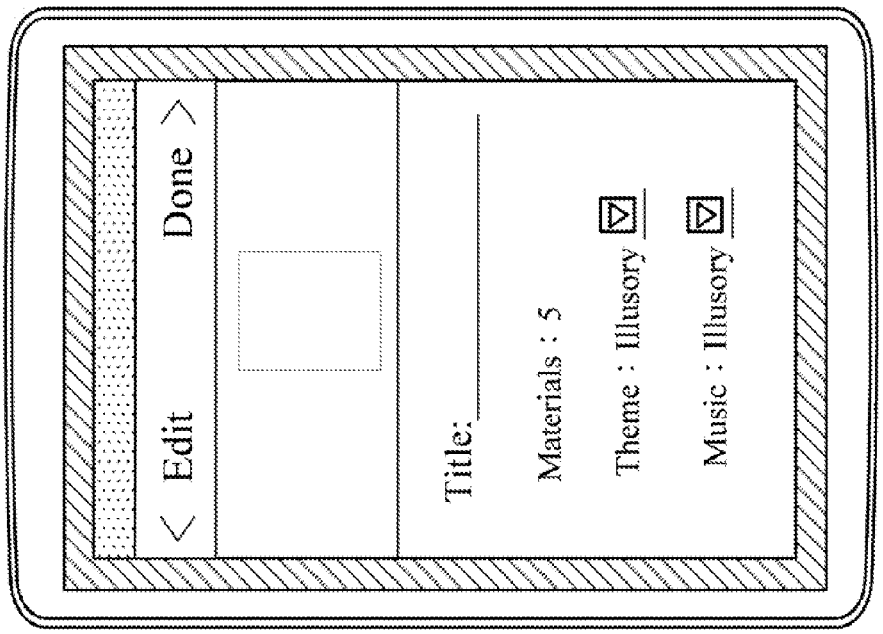
FIG. 3B illustrates a schematic diagram of a user interface according to a first embodiment of the disclosure.
Figure 3A:
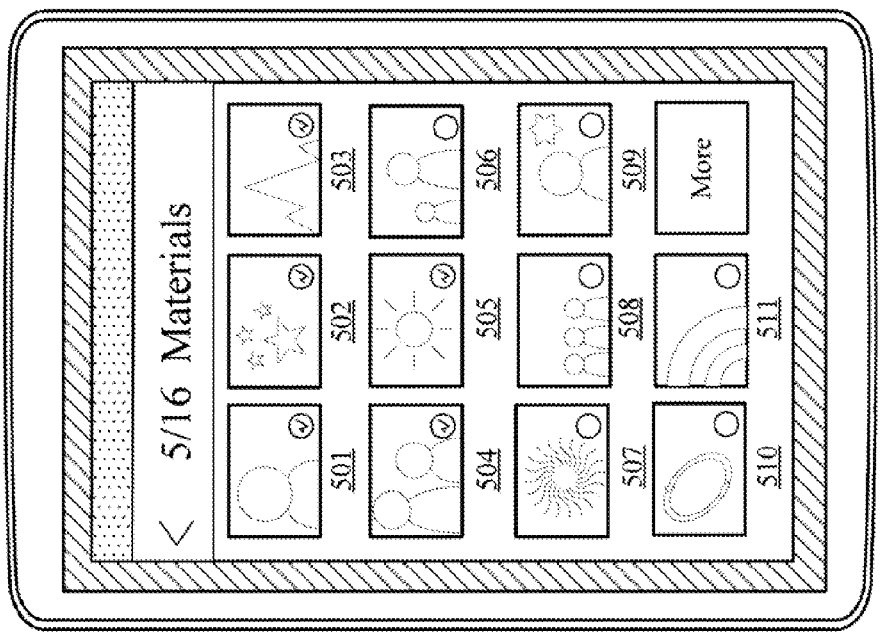
FIG. 3A illustrates a schematic diagram of a user interface according to one step of the media data processing method in FIG. 2A.

Reference is made to FIG. 3A and FIG. 3B. FIG. 3A illustrates a schematic diagram of a user interface 402 according to one step S210 of the media data processing method 200 in FIG. 2A. FIG. 3B illustrates a schematic diagram of a user interface 404 according to a first embodiment of the disclosure. In one embodiment, the user interface 402 can be provided by a specific application program (e.g., Zoe application program of HTC) installed in the portable mobile device. As shown in FIG. 3A, the user interface 402 can be displayed on a screen (not shown in the figure) of the portable mobile device. In the user interface 402, Zoe application program can connect to an album program installed in the portable mobile device, and provide several stored media files (e.g., 11 photos 501-511 in FIG. 3A) of the album for the user to select.

In one embodiment, before the user uploads the media files, Zoe application program can perform operation of mix and edition on the media files selected by the user (e.g., the selected 5 photos 501-505 in FIG. 3A as materials of the edited video) and the selected parameters in the client, as shown in FIG. 3B. In FIG. 3B, Zoe application program provides the parameters such as themes and music for the user to select on the user interface 404. The user can select one theme among the provided themes and one music among the provided music. Next, Zoe application program can perform operation of mix and edit on the materials (i.e., the media files such as the selected 5 photos 501-505 in FIG. 3A), the selected theme (e.g., "Illusory" in FIG. 3B) and the selected music (e.g., "Illusory" in FIG. 3B), so as to generate a pre-viewed video and display the pre-viewed video to the user on the user interface.

In the present embodiment, in addition that the user can select the media files among the stored media files of the album by itself, Zoe application program can automatically select the media files for mixing and editing according to previous setting. In one embodiment, each of the stored media files of the album includes a number of comments (e.g., number of message, number of good, number of sharing, etc.), and the number of comments of the media files selected by Zoe application program is greater than a predetermined threshold number. In other words, when the number of comments of partial of the stored media files of the album are greater than the threshold number, Zoe application program selects these stored media files as the uploaded media files.

In another embodiment, each of the stored media files of the album includes a time of shooting, and a period between the time of shooting of the media files selected by Zoe application program and a time for selecting the media files is greater than a predetermined threshold period. For example, Zoe application program can select the stored media files that a period between the time of shooting of itself and a current time within a week as the uploaded media files.

Figure 2B:
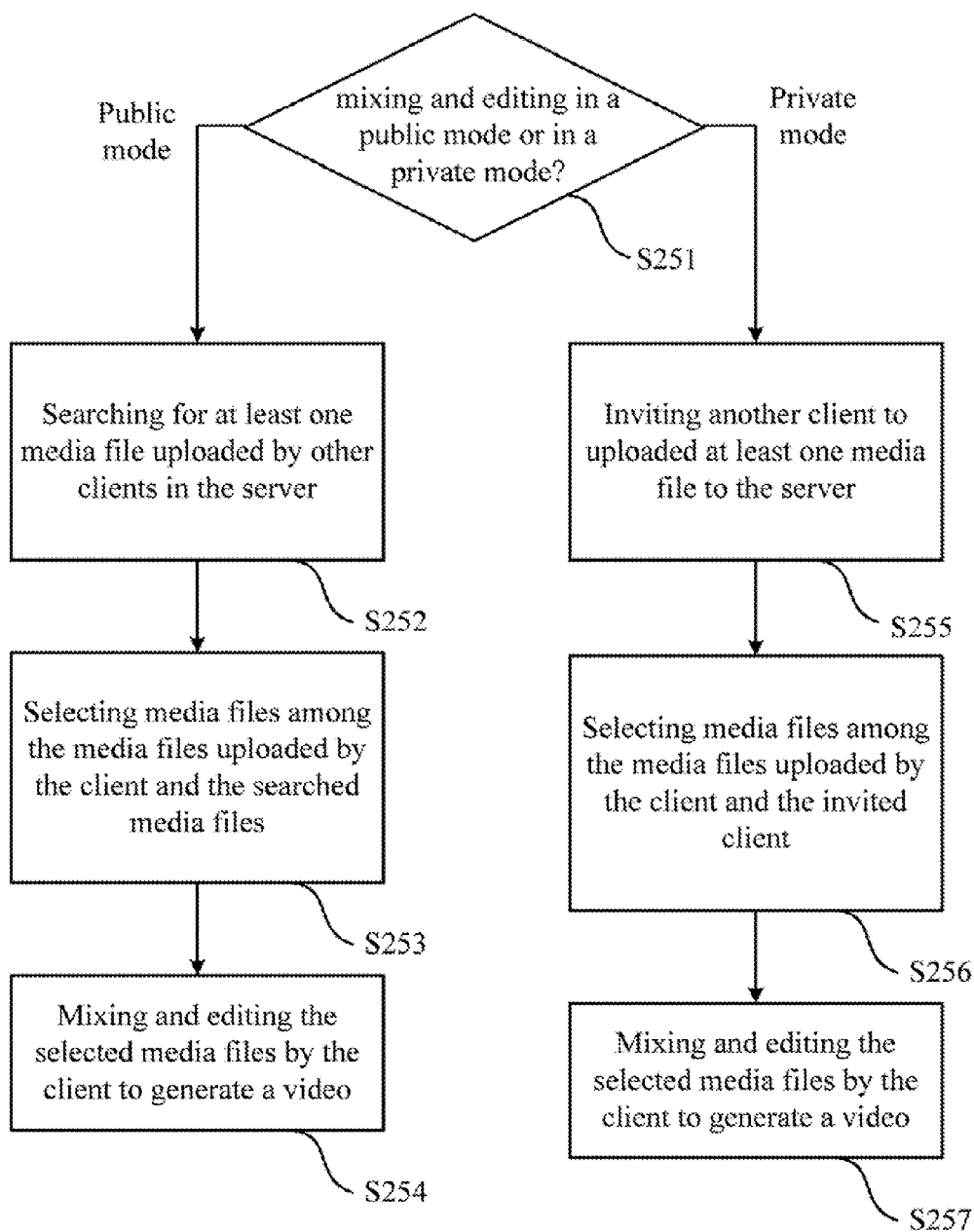
FIG. 2B illustrates a flow chart of one step of the media data processing method in FIG. 2A.
Figure 3D:
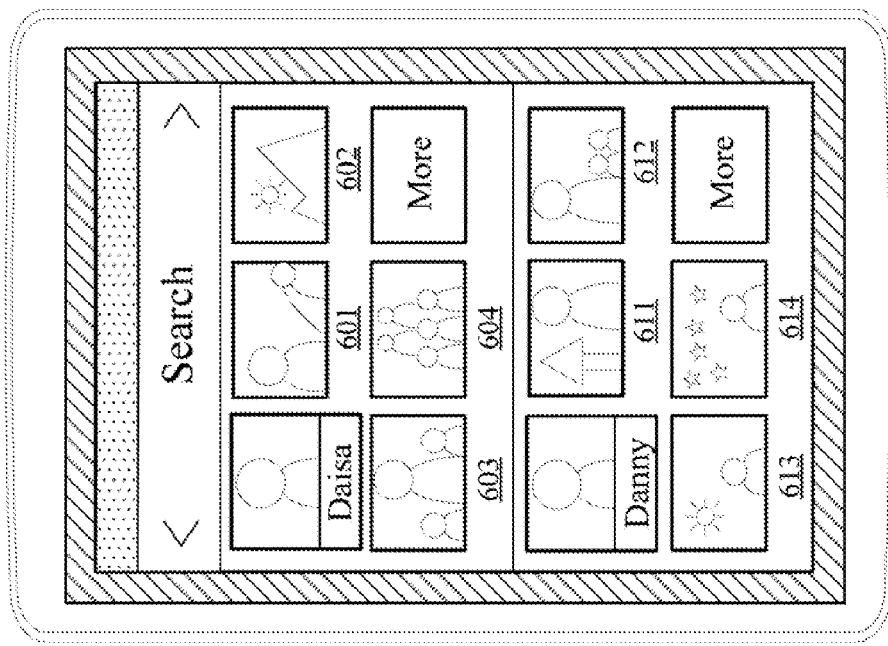
FIG. 3D illustrates a schematic diagram of a user interface according to one step in FIG. 2B.
Figure 3C:
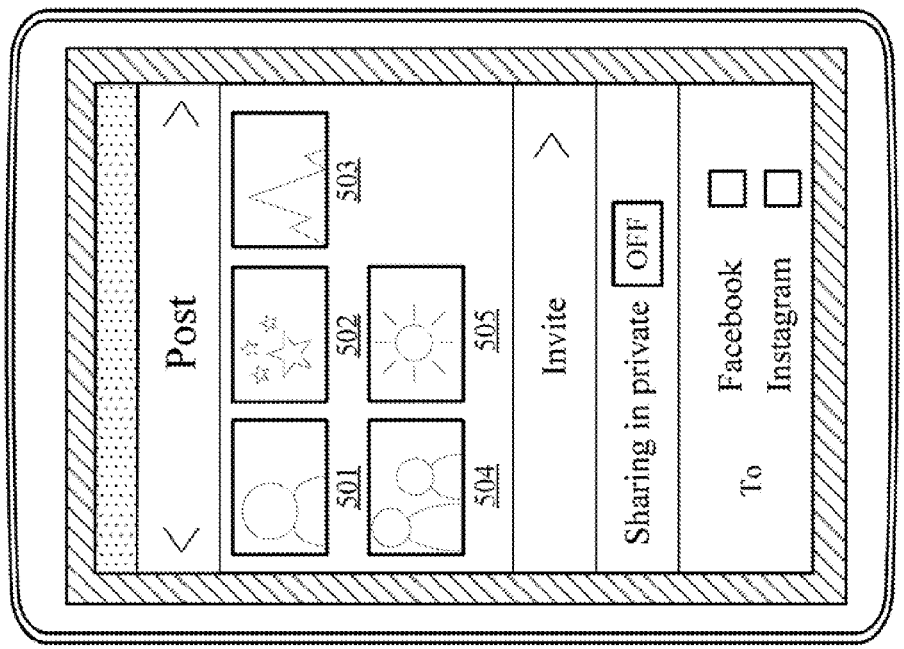
FIG. 3C illustrates a schematic diagram of a user interface according to one step in FIG. 2B.

In FIG. 2A, after the at least media file is selected by the client, operation S230 is executed. In operation S230, the at least media file is uploaded to a server. Next, in operation S250, the uploaded media file and the at least one media file in the server are mixed and edited to generate a video. In one embodiment, operation S250 further includes operation S251-S257. Reference is made to FIG. 2B. FIG. 2B illustrates a flow chart of one step S250 of the media data processing method 200 in FIG. 2A. As shown in FIG. 2B, first, in operation S251, a determination is made as to whether operation of mix and edition is performed in a public mode or a private mode. Reference is made to FIG. 3C. FIG. 3C illustrates a schematic diagram of a user interface 406 according to one step S251 in FIG. 2B. In user interface 406, Zoe application program provides an item "Sharing in private" for the user to select. Zoe application program can determine whether to perform mix and edition in the public mode or the private mode according whether the item "Sharing in private" is selected by the user. When the user turns on the item "Sharing in private", Zoe application program performs operation of mix and edition in the private mode. When the user turns off the item "Sharing in private", Zoe application program performs operation of mix and edition in the public mode.

Figure 3E:
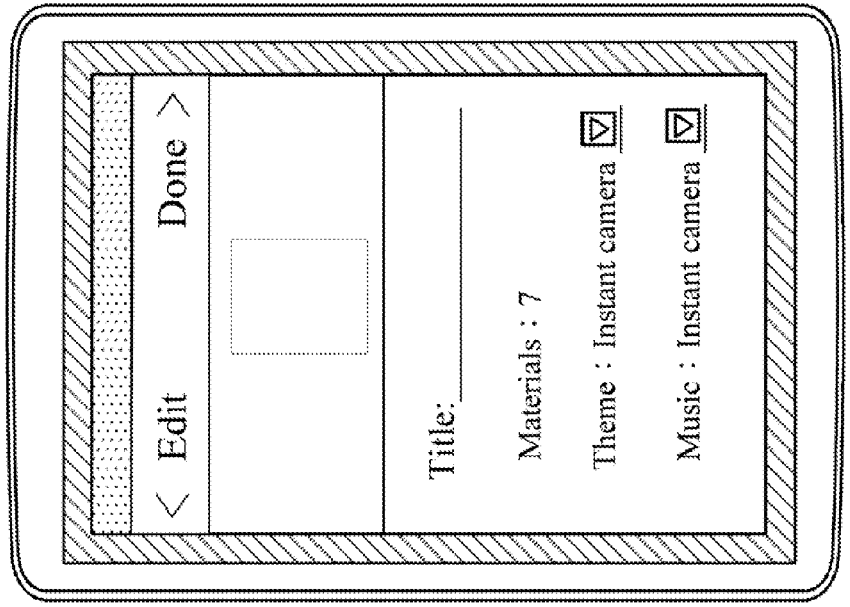
FIG. 3E illustrates a schematic diagram of a user interface according to one step in FIG. 2B.
Figure 3F:
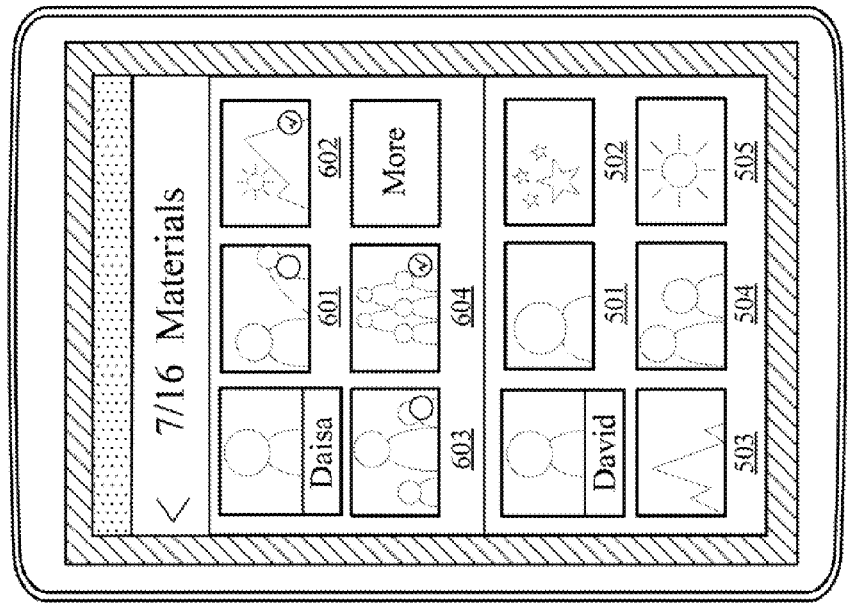
FIG. 3F illustrates a schematic diagram of a user interface according to one step in FIG. 2B.

When operation of mix and edition is performed in the public mode, operations S252-S254 are executed. Reference is made to FIG. 3D, FIG. 3E and FIG. 3F. FIG. 3D illustrates a schematic diagram of a user interface 408 according to one step S252 in FIG. 2B. FIG. 3E illustrates a schematic diagram of a user interface 410 according to one step S253 in FIG. 2B. FIG. 3F illustrates a schematic diagram of a user interface 412 according to one step S254 in FIG. 2B In operation S252, at least one media file uploaded by other clients in the server client is searched for. Specifically, the user can search the media files stored in the server client by the other clients. As shown in FIG. 3D, when operation of mix and edition is performed in the public mode, Zoe application program can search for the clients which upload the media files in the public mode and display the searched clients (e.g., Daisa and Danny) and the uploaded media files thereof (e.g., the photos 601-604 uploaded by Daisa and the photos 611-614 uploaded by Danny) to the user on the user interface 408.

Next, in operation S253, several media files are selected among the media files uploaded by the user client and the searched media files. Specifically, the user can select partial of the media files uploaded by itself and the media files for which Zoe application program searches (from other clients and allowed to be used) for performing operation of mix and edition. As shown in FIG. 3E, in the user interface 410, it displays the media files (e.g., photos 501-505 in FIG. 3E) uploaded by the user itself (e.g., David) through the client and the media files (e.g., photos 601-604 in FIG. 3E) uploaded by other clients (e.g., Daisa). Next, the user can select several media files (e.g., the photos 501-505, 602 and 604 in FIG. 3E) among the uploaded media files and the searched media files to perform operation of mix and edition, Next, in operation S254, the selected media files are mixed and edited by the client to generate the video. Similarly, as shown in FIG. 3F, Zoe application program can further provide the build-in parameters (e.g., themes and music) for the user to select. As shown in FIG. 3F, Zoe application program provides the parameters including themes and music for the user to select on the user interface 412. The user can select one theme among the provided themes and one music among the provided music. Next, Zoe application program can mix and edit the materials (i.e., the media files such as the photos 501-505, 602 and 604 in FIG. 3E) with the selected theme (e.g., "Instant camera" in FIG. 3F) and the selected music (e.g., "Instant camera" in FIG. 3F), so as to generate a video.

Figure 3H:
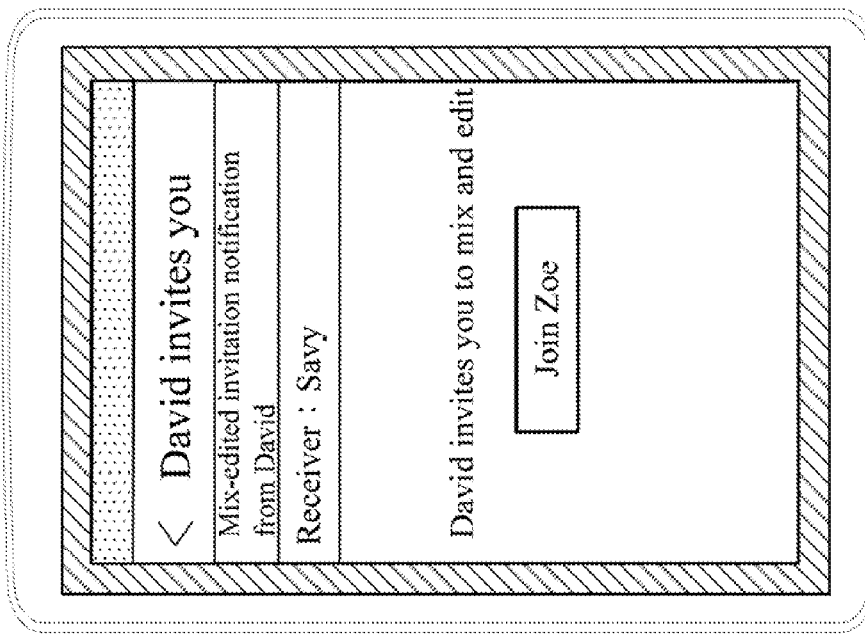
FIG. 3H illustrates a schematic diagram of a user interface according to one step in FIG. 2C.
Figure 3G:
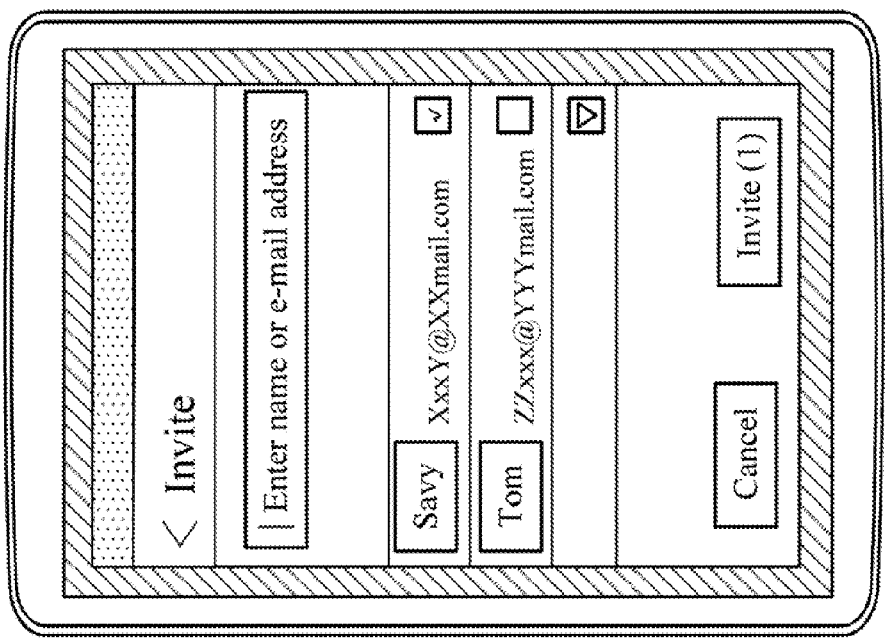
FIG. 3G illustrates a schematic diagram of a user interface according to one step in FIG. 2B.

In operation S251, when operation of mix and edition is performed in the private mode, operations S255-S257 are executed. Reference is made to FIG. 3G. FIG. 3G illustrates a schematic diagram of a user interface 414 according to one step S255 in FIG. 2B. In operation S255, another client is invited to upload at least one media file to the server by the client (i.e., the client of original owner). In one embodiment, the method of inviting another client to upload the at least one media file to the server includes sending a mix-and-edit invitation notification from the client to another client according to a name or e-mail address of a user of another client. Specifically, when the user turns of the item "Sharing in private" on the user interface 406 in FIG. 3C, the user can see the image displaying the user interface 414 in FIG. 3G switched from the user interface 406 on the screen of the portable mobile device. Next, the user can input the name or e-mail address of a use of another client on the user interface 414. Zoe application program sends the mix-and-edit invitation notification to another client according to the name or e-mail address of the user of another client. In another embodiment, the user can select clients in an address book program installed in the portable mobile device and sends the mix-and-edit invitation notification to the selected client (e.g., Savy).

Next, in operation S256, several media files are selected by the client (i.e., the client of original owner) among the uploaded media files by the client and the media files uploaded by another client (i.e., the invited client). It is supposed that another client accepts the mix-and-edit invitation notification and uploads at least one media file. At this time, the user can see the condition similar to the user interface 410 in FIG. 3E on the client. In other words, the user can see the media files uploaded by it and the media file uploaded by another client. Next, the user can select several media files among the media files uploaded by it and the media file uploaded by another client on the user interface.

Next, in operation S257, the selected media files are mixed and edited by the client to generate the video, the operation thereof is similar to operation S254, and thus there is no further detailed herein.

Figure 2C:
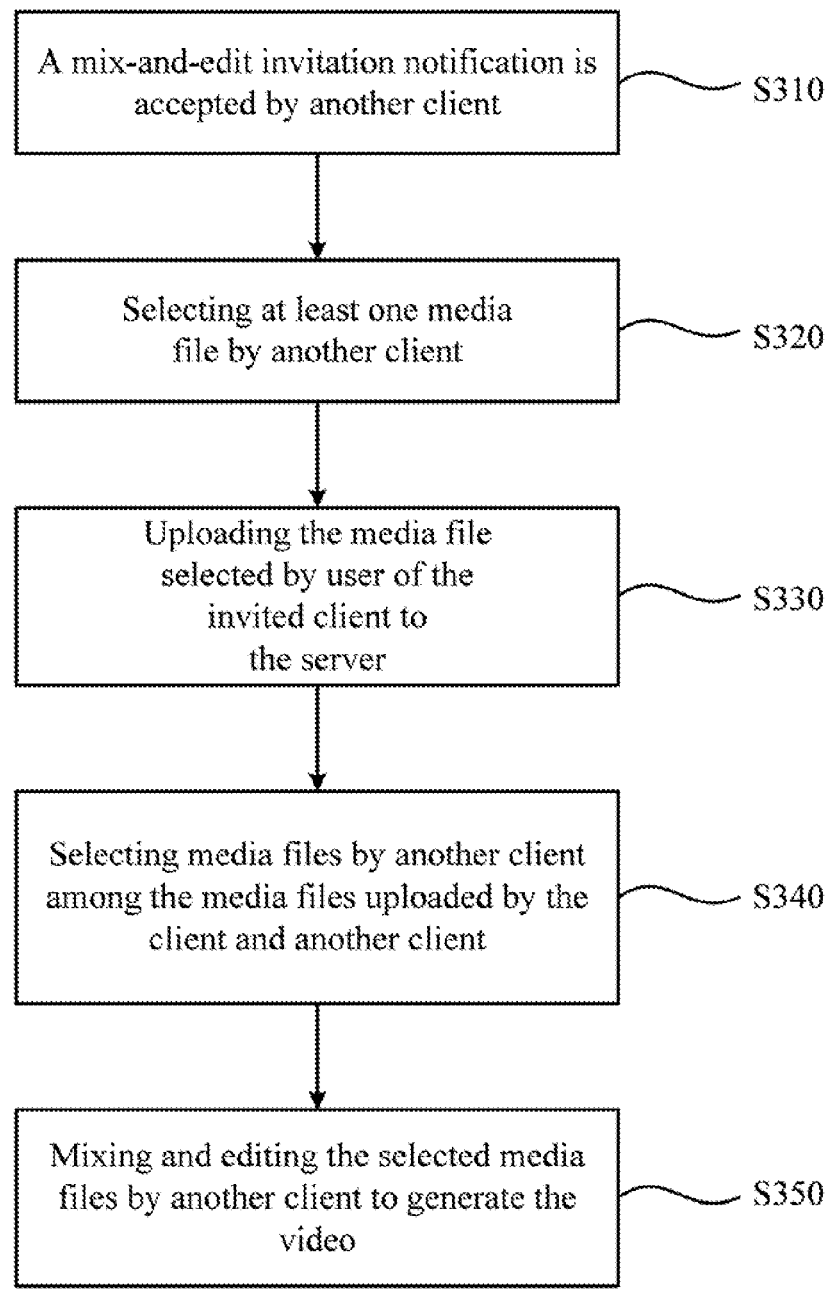
FIG. 2C illustrates a flow chart of another media data processing method according to one step in FIG. 2B.

Reference is made to FIG. 2C. FIG. 2C illustrates a flow chart of another media data processing method 30 according to the step S255 in FIG. 2B. The media data processing method 300 is configured to process the media files selected by a user of another client (i.e., the invited user). In operation S255 in FIG. 2B, the user of the client sends the mix-and-edit invitation notification to another client. First, in operation S310, the mix-and-edit invitation notification is accepted by another client. Reference is made to FIG. 3H. FIG. 3H illustrates a schematic diagram of a user interface 416 according to one step S310 in FIG. 2C. As shown in FIG. 3H, when the user sends the mix-and-edit invitation notification to another client by the client, the user interface 416 displays a confirmation menu on another client for the invited user to confirm. When the invited user accepts the mix-and-edit invitation notification (e.g., click a button "Join Zoe" in FIG. 3H), operation S320 is executed.

In operation S320, at least one media file is selected by another client. Similarly, the invited user (e.g., Savy) can select at least one media file (e.g., photos or films) among an album program installed in the portable mobile device as partial of content of a desired mix-and-edit video. Reference is made to FIG. 3I. FIG. 3I illustrates a schematic diagram of a user interface 418 according to one step S320 in FIG. 2C. In the user interface 418, the invited user not only can select at least one media file in the album (e.g., photos 701-705 in FIG. 3I), but also can see the media files (e.g., photos 501-505 in FIG. 3I) uploaded by the user (e.g., David) of the client. Accordingly, the user of another client can determine which the media files to be selected (e.g., the photos 702-705 on FIG. 3I) according to the shared media files by the user of the client (e.g., the photos 501-505 in FIG. 3I), so as to realize creating the video together.

Figure 3J:
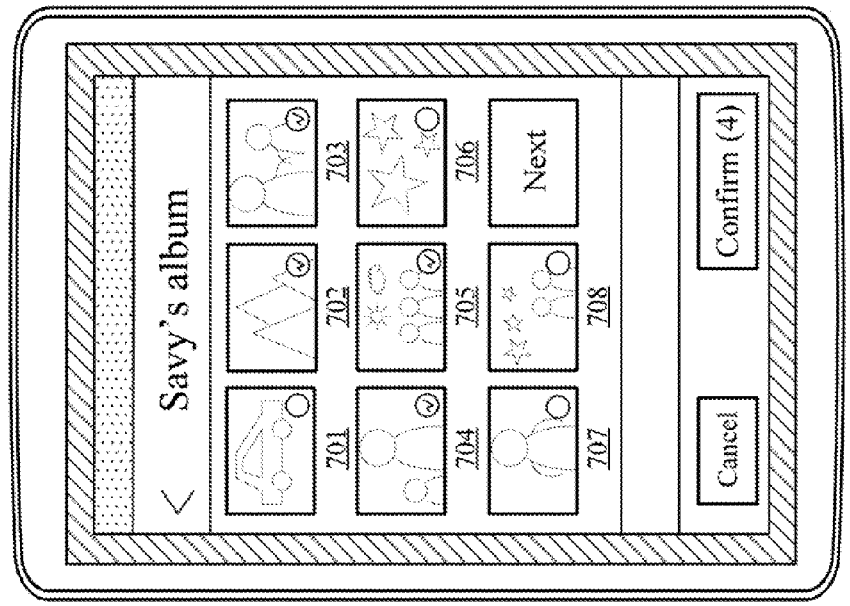
FIG. 3J illustrates a schematic diagram of a user interface according to a second embodiment of the disclosure.
Figure 3I:
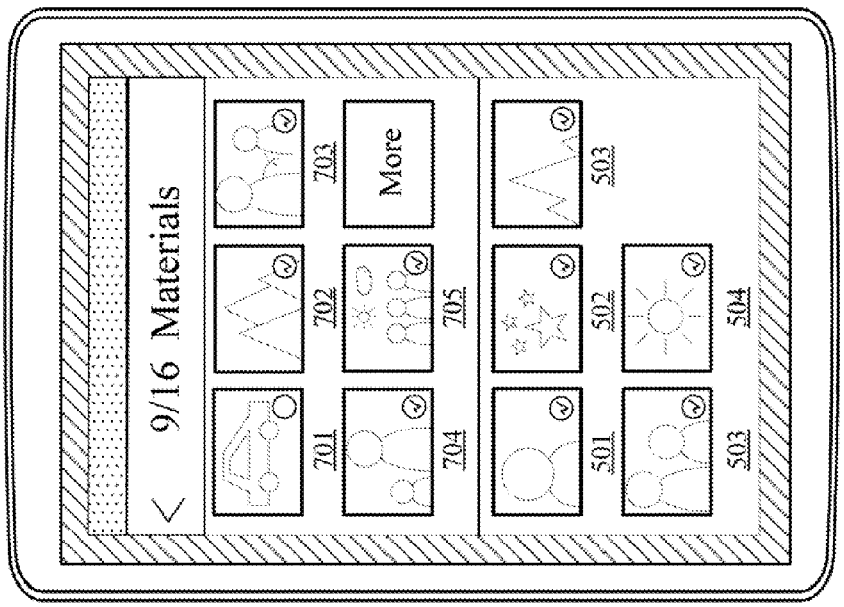
FIG. 3I illustrates a schematic diagram of a user interface according to one step in FIG. 2C.

Moreover, reference is made to FIG. 3J. FIG. 3J illustrates a schematic diagram of a user interface 420 according to a second embodiment of the disclosure. In FIG. 3J, when the invited client (e.g., Savy) select the item "More", the user interface 420 provides other photos in the album (e.g., photos 706, 707 and 708 in FIG. 3J) for the invited client to select.

The invited client can select other photos in the album (.G. photos 706, 707 and 708 in FIG. 3J). Moreover, by selecting the item "Next", the invited client can further select other photos in the album. In one embodiment, when the user select one photo (i.e., the material) and hold the photo for a while, the selected photo can be displayed in full screen.

Figure 3L:
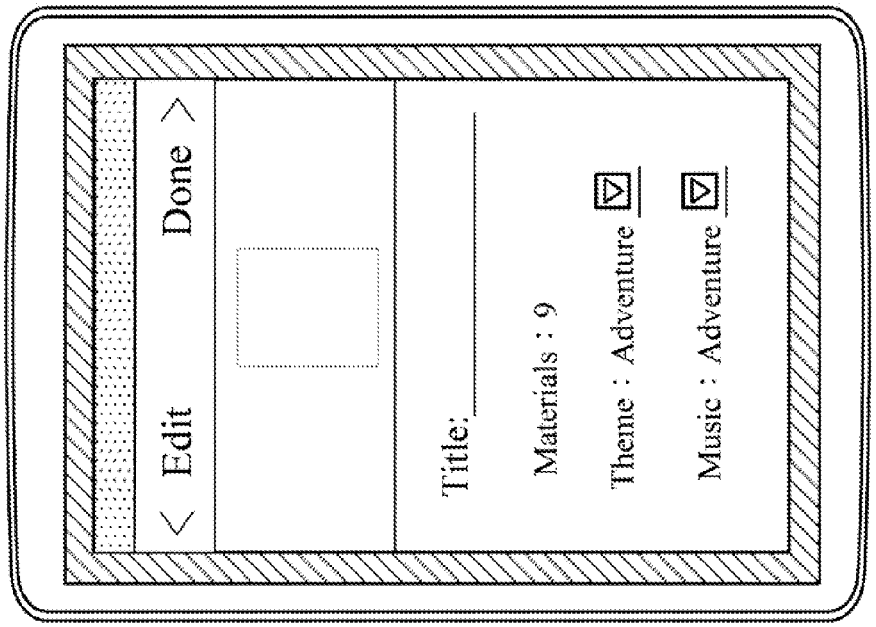
FIG. 3L illustrates a schematic diagram of a user interface according to one step in FIG. 2C.
Figure 3K:
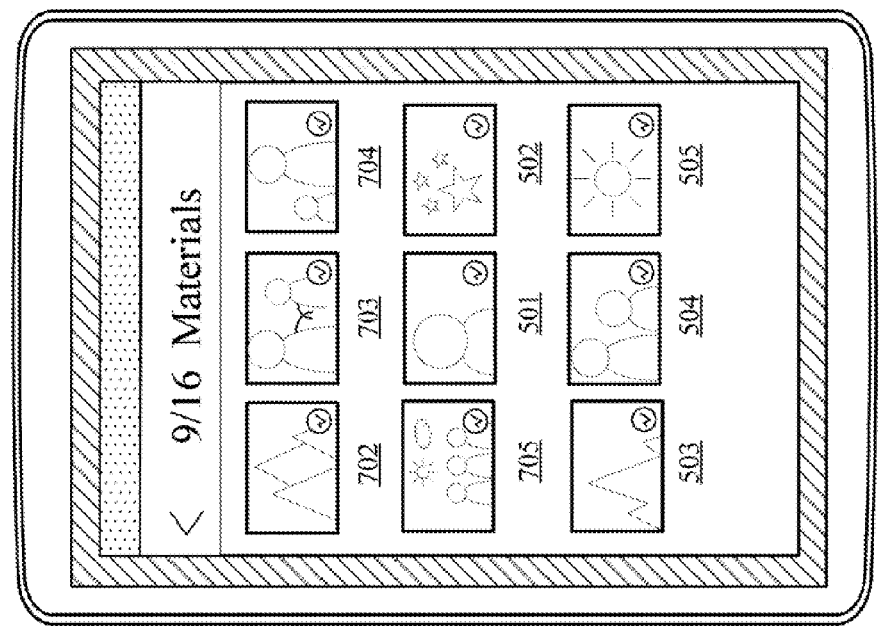
FIG. 3K illustrates a schematic diagram of a user interface according to one step in FIG. 2C.

Next, in operation S330, the media files selected by the user of the invited client are uploaded to the server. Next, in operation S340, several media files are selected by the user of the invited client among the media files uploaded by the invited client and the media files uploaded by the client (i.e., the client of original owner). Reference is made to FIG. 3K; FIG. 3K illustrates a schematic diagram of a user interface 422 according to one step S330 in FIG. 2C. In the user interface 422, the invited user (e.g., Savy) can see the media files uploaded by itself (e.g., the photos 702-704) and the media files (e.g., the photos 501-505) uploaded by the user (e.g., David) of the client, and can select media files among them as the content of the video.

Next, in operation S350, the selected media files are mixed and edited by another client to generate the video. Reference is made to FIG. 3L. FIG. 3L illustrates a schematic diagram of a user interface 424 according to one step S350 in FIG. 2C. Similarly, Zoe application program can further provide the build-in parameters (e.g., themes and music) for the invited client (e.g., Savy) to select. As shown in FIG. 3L, the invited client can select one theme among the provided themes and one music among the provided music. Next, Zoe application program can mix and edit the materials (i.e., the media files such as the photos 501-505, and 702-705 in FIG. 3K) with the selected theme (e.g., "Adventure" in FIG. 3F) and the selected music (e.g., "Adventure" in FIG. 3F), so as to generate a video.

By the aforementioned embodiments, the user can invite another user to realize sharing and editing the media files uploaded by each other.

In FIG. 2A, in one embodiment, the media data processing method 200 further includes operation S270. In operation S270, the video is returned to the first client by the server. In one embodiment, in operation of mixing and editing the media files, user of each of the clients can post the video to personal social networking websites (e.g., Facebook, Twitter, Instagram, etc.). Therefore, in addition to return the video to the client, the server can further generate a linked address corresponding to the video and post the liked address on the social networking websites selected by the client after the server generates the video. Accordingly, the user not only can view the edited video on the user interface of the client, but also can view the edited video on the social networking websites.

To sum up, by the aforementioned embodiments, user can perform operation of mix and edition on his own media files and other's media files, such that content of the video becomes more abundant and diversified. Moreover, by performing operation of mix and edition on the media files in the private mode or in the public mode, the user can decide to select the materials and edit the video with strangers or friends, such that enjoyment for editing video is increased and content of the edited video becomes more diversified.

Although the disclosure has been described in considerable detail with reference to certain embodiments thereof, other embodiments are possible. It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A media data processing method adapted for a portable mobile device, comprising:
    selecting at least one first media file by a first client;
    uploading the at least one first media file to a server by the first client;
    inviting a second client for selecting and uploading at least one second media file to the server; and
    mixing and editing the at least one first media file in the server and the at least one second media file in the server to generate a video by the second client:
    wherein selecting the at least one first media file by the first client comprises:
    selecting the at least one first media file from an album corresponding to the first client, wherein the album comprises a plurality of stored media files, wherein each of the stored media file comprises a time of shooting, and a period between the time of shooting corresponding to the at least one first media file and a time of selecting the at least one first media file is within a threshold period.

2. The media data processing method of claim 1, further comprising:
    returning the video to the first client by the server.

3. The media data processing method of claim 1, further comprising:
    posting a linked address corresponding to the video on at least one social networking website of a user of the first client by the server.

4. The media data processing method of claim 1, wherein mixing and editing the at least one first media file and the at least one second media file to generate the video comprises:
    selecting a plurality of third media files among the at least one first media file and the at least one second media file by the first client or the second client;
    selecting a theme among a plurality of build-in themes and a music among a plurality of build-in music by the first client or the second client; and
    mixing and editing the third media files according to the selected theme and music to generate the video.

5. The media data processing method of claim 1, wherein inviting the second client to upload the at least one second media file to the server by the first client comprises:

sending a mix-and-edit invitation notification to the second client from the first client according to a user name or an e-mail address of the second client;
selecting the at least one second media file by the second client on condition that the second client accepts the mix-and-edit invitation notification; and
uploading the at least one second media file to the server.

6. The media data processing method of claim 1, wherein mixing and editing the at least one first media file and the at least one second media file in the server to generate the video comprises:
searching for the at least one second media file uploaded by at least one third client in the server;
selecting a plurality of third media files among the at least one first media file and the at least one second media file by the first client; and
mixing and editing, the third media files to generate the video.

7. The media data processing method of claim 1, wherein mixing and editing the at least one first media file and the at least one second media file in the server to generate the video comprises:
selecting a theme among a plurality of build-in themes and a music among a plurality of build-in music; and
mixing and editing the at least one first media file and the at least one second media file according to the selected theme and music to generate the video.

8. The media data processing, method of claim 1, wherein selecting the at least one first media file by the first client comprises:
wherein each of the stored media file comprises a number of comments, and the number of comments corresponding to the at least one first media file is greater than a threshold number.

9. A media data processing method adapted for a portable mobile device, comprising:
selecting at least one first media file by a first client;
uploading the at least one first media file to a server by the first client;
inviting a second client by the first client;
selecting at least one second media file by the second client;
uploading the at least one second media file to the server by the second client; and
mixing and editing the at least one first media file in the server and the at least one second media file in the server to generate a video by the second client;
wherein selecting the at least one first media file by the first client comprises:
selecting the at least one first media file from an album corresponding to the first client, wherein the album comprises a plurality of stored media files, wherein each of the stored media file comprises a time of shooting, and a period between the time of shooting corresponding to the at least one first media file and a time of selecting the at least one first media file is within a threshold period.

10. The media data processing method of claim 9, further comprising:
returning the video to the first client or the second client by the server.

11. The media data processing method of claim 9, wherein selecting the at least one second media file by the second client comprises:
sending a mix-and-edit invitation notification to the second client by the first client; and
selecting the at least one second media file by the second client on condition that the second client accepts the mix-and-edit invitation notification.

12. The media data processing method of claim 9, wherein mixing and editing the at least one first media file and the at least one second media file by the first client or the second client to generate the video in the server comprises:
selecting at least one third media file among the at least one first media file and the at least one second media file by the first client or the second client; and
mixing and editing the at least one third media file according to a theme of a plurality of build-in themes and a music of a plurality of build-in music by the server.

13. A non-transitory computer-readable recording medium storing a computer program performing a media data processing method, the media data processing method comprising:
selecting at least one first media file by a first client;
uploading the at least one first media file to a server by the first client;
inviting a second client for selecting and uploading at least one second media file to the server; and
mixing and editing the at least one first media file in the server and the at least one second media file in the server to generate a video by the second client;
wherein selecting the at least one first media file by the first client comprises;
selecting the at least one first media file from an album corresponding to the first client, wherein the album comprises a plurality of stored media files, wherein each of the stored media file comprises a time of shooting, and a period between the time of shooting corresponding to the at least one first media file and a time of selecting the at least one first media file is within a threshold period.

14. The non-transitory computer-readable recording medium of claim 13, wherein the media data processing method further comprises:
returning the video to the first client by the server and/or posting a linked address corresponding to the video on at least one social networking website of a user of the first client by the server.

15. The non-transitory computer-readable recording medium of claim 13, wherein mixing and editing the at least one first media file and the at least one second media file to generate the video comprises:
selecting a plurality of third media files among the at least one first media file and the at least one second media file by the first client or the second client;
selecting a theme among a plurality of build-in themes and a music among a plurality of build-in music by the first client or the second client; and
mixing and editing the third media files according to the selected theme and music to generate the video.

16. The non-transitory computer-readable recording medium of claim 13, wherein inviting the second client to upload the at least one second media file to the server by the first client comprises:
sending a mix-and-edit invitation notification to the second client from the first client according to a user name or an e-mail address of the second client;
selecting the at least one second media file by the second client on condition that the second client accepts the mix-and-edit invitation notification; and
uploading the at least one second media file to the server.

17. The non-transitory computer-readable recording medium of claim 13, wherein mixing and editing the at least one first media file and the at least one second media file in the server to generate the video comprises:
- searching for the at least one second media file uploaded by at least one third client in the server;
- selecting a plurality of third media tiles among the at least one first media file and the at least one second media file by the first client; and
- mixing and editing the third media files to generate the video.

* * * * *